(12) United States Patent
Sekiguchi et al.

(10) Patent No.: US 6,948,100 B1
(45) Date of Patent: Sep. 20, 2005

(54) COMPUTER SYSTEM AND METHOD OF HANDLING TROUBLE OF COMPUTER SYSTEM

(75) Inventors: Tomoki Sekiguchi, Kawasaki (JP); Toshiaki Arai, Kawasaki (JP); Hiroshi Furukawa, Kawasaki (JP); Kazumi Ikeda, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/622,372

(22) PCT Filed: Feb. 24, 1999

(86) PCT No.: PCT/JP99/00836

§ 371 (c)(1),
(2), (4) Date: Jan. 12, 2001

(87) PCT Pub. No.: WO00/51000

PCT Pub. Date: Aug. 31, 2000

(51) Int. Cl.⁷ ............................................. G06F 11/00
(52) U.S. Cl. ..................................................... 714/43
(58) Field of Search ........................................ 714/43

(56) References Cited

U.S. PATENT DOCUMENTS

| | | | | |
|---|---|---|---|---|
| 4,149,038 A | * | 4/1979 | Pitroda et al. | 370/244 |
| 5,008,885 A | * | 4/1991 | Huang et al. | 714/703 |
| 5,058,112 A | * | 10/1991 | Namitz et al. | 714/703 |
| 5,204,864 A | * | 4/1993 | Won | 714/43 |
| 5,428,624 A | * | 6/1995 | Blair et al. | 714/727 |
| 5,659,681 A | * | 8/1997 | Ojima | 714/43 |
| 6,032,271 A | * | 2/2000 | Goodrum et al. | 714/56 |
| 6,098,137 A | * | 8/2000 | Goodrum et al. | 710/311 |
| 6,182,248 B1 | * | 1/2001 | Armstrong et al. | 714/43 |
| 6,463,554 B1 | * | 10/2002 | Budelman et al. | 714/47 |
| 6,519,718 B1 | * | 2/2003 | Graham et al. | 714/41 |

FOREIGN PATENT DOCUMENTS

| | | |
|---|---|---|
| JP | 1-292553 | 11/1989 |
| JP | 5-250284 | 9/1993 |
| JP | 5-257914 | 10/1993 |
| JP | 9-50386 | 2/1997 |

OTHER PUBLICATIONS

PCI Hardware and Software Architecture Design, Annabooks, 1994, pp. 172-174.
Microprocessor Report, vol. 12, No. 9, Jul. 13, 1998, pp. 6-12.

* cited by examiner

Primary Examiner—Robert Beausoliel
Assistant Examiner—Michael Maskulinski
(74) Attorney, Agent, or Firm—Mattingly, Stanger, Malur & Brundidge, P.C.

(57) ABSTRACT

A manager transmits an I/O bus signal to an I/O bus manager in a computer at a predetermined point of time to inform the I/O bus manager of occurrence of an I/O bus fault. The I/O bus manager initializes an I/O bus and then informs a CPU in the computer of the I/O bus fault as an interruption to be processed by an OS operated by the CPU, whereby the OS can acquire the fault information after the interruption even in the case where an I/O bus fault occurs.

9 Claims, 15 Drawing Sheets

COMPUTER SYSTEM AND METHOD OF HANDLING TROUBLE OF COMPUTER SYSTEM

TECHNICAL FIELD

The present invention relates to a computer system and particularly to a computer system which performs fault processing efficiently.

BACKGROUND ART

There is a method for managing a computer by a remote manager which is an input-output device for remote management and which is connected to the computer through an I/O bus such as a PCI bus, or the like. The remote manager has communication input-output devices such as a network adapter, a modem, etc. The remote manager is connected to another computer by LAN, telephone line, or the like, so that the remote manager manages the first-mentioned computer from the other computer in a remote place.

The remote manager acquires operating information of the computer via an I/O bus or a private bus for transferring management information of the computer to be managed. The remote manager has registers and memories so that a CPU in the computer to be managed can make access to the registers and memories via an I/O bus.

The remote manager may be configured as a computer (manager computer) having a CPU, a memory, and I/O devices including communication devices such as a network adapter and a modem as described in JP-A-9-50386, JP-A-5-257914 and JP-A-5-250284. In this case, the CPU on the manager computer can execute a management program independently of the computer to be managed, that is, the CPU can execute the management program regardless of the operating state of the computer to be managed. That is, the manager computer can execute the management program even before the start of an operating system (OS) of the computer or even in the case where the computer is halted due to a fault and is disabled (hung up) from accepting any operation from the outside.

When such a hang-up fault occurs in the computer to be managed, the manager in the background art connected to an I/O bus restarts the computer by a method such as resetting the CPU, cutting off a power supply to the computer to be managed, or the like. The restart is achieved by connecting the manager to the computer to be managed by a private signal line and by making the manager transmit a reset signal to the CPU of the computer to be managed via the signal line or by making the manager transmit an interruption to shift control to firmware on the computer to be managed. The private signal line is required because the I/O bus has no signal line to transmit an interrupt to force the execution of the OS to stop.

To carry out the restarting method, another signal line than the I/O bus must be set up between the manager and the computer to be managed. Hence, there is a problem that the computer to be managed is limited to a computer which can be connected to the manager. That is, unless a combination of a computer to be managed and a manager can be connected to each other through a private line, the computer to be managed cannot be restarted from the manager side when a fault occurs in the computer.

In the background art, the restarting is performed on the basis of resetting of the CPU. Accordingly, there is no opportunity of interposition of the OS. In addition, the contents of the main memory in the computer to be managed are lost because of the restart of the OS. Hence, it becomes difficult to analyze a cause of a fault. There is also a problem that the fault cannot be analyzed when the fault is not reproducible.

On the other hand, a general-purpose I/O bus such as a PCI bus is configured so that an interrupt to force the OS to execute fault processing cannot be transmitted from the manager to the computer to be managed. In some case, however, such an I/O bus has a signal line to transfer additional information (such as parity bit) for guaranteeing the accuracy of address, command, data, etc. which are transferred via the I/O bus (PCI Hardware and Software Architecture Design, pp 172–174, Annabooks, 1994). If an I/O bus can transfer such additional information, the computer to be managed or an input/output device of the computer can verify the accuracy of data on the I/O bus in the data transfer via the I/O bus.

In addition, in the case where an I/O bus having the aforementioned function is used, there is provided an I/O bus controller which has a signal line to inform the CPU of a fault when an incorrect signal is detected on the basis of the additional information on the I/O bus (Microprocessor Report, pp 11–12, Vol. 12, Number 9, July, 1998).

With respect to the CPU in the computer to be managed, the CPU may be disabled from making access to a memory when a fault occurs in the bus. Hence, a situation that the CPU cannot operate may occur. In the case where the bus is locked as described above, it is impossible to restart the execution of the CPU even if an interrupt signal is transmitted to the CPU. This is because memory access is disabled by the bus fault so that an interrupt handler cannot be started.

As a measure against such a fault, there is a CPU which reinitializes only a bus without resetting the CPU itself and then internally generates an interrupt to shift control to the interrupt handler when a fault signal concerning the bus is detected (Microprocessor Report, pp 1, 6–10, Vol. 12, Number 9, July, 1998). With the CPU, the execution of the CPU can be restarted so that the fault processing by the OS can be started, even in the case where the bus is locked.

In a manager for a computer connected to an I/O bus in the background art, the computer is restarted as a whole by a method of resetting the CPU of the computer through another signal line than the I/O bus or by a method of resetting the CPU on the basis of firmware on the computer when a fault disabling the OS from executing the fault processing occurs in the computer. In these methods, however, there was a problem that the OS could not carry out the fault processing because the CPU was reset, so that it becomes impossible to acquire fault information.

Moreover, the manager in the background art required another signal line than the I/O bus or required a circuit or firmware provided on the computer to execute a process of resetting the CPU. In this method, there was a problem that the computer which was allowed to be connected to the manager was limited.

An object of the present invention is to provide a computer system in which a computer can acquire fault information even in the case where a fault disabling an OS from executing fault processing occurs in the computer.

Another object of the present invention is to provide a computer system in which a bus used by a computer to be managed can be initialized through an I/O bus.

DISCLOSURE OF THE INVENTION

To achieve the foregoing objects, according to the present invention, in a computer system in which a computer and a manager are connected to each other through an I/O bus, when a fault disabling an OS from executing fault processing occurs in the computer, a fault manager transmits an I/O bus signal to an I/O bus manager in the computer to inform the I/O bus manager of occurrence of an I/O bus fault. The I/O bus manager initializes the I/O bus and then informs a CPU in the computer of the I/O bus fault as an interrupt to be processed by the OS.

In this manner, it is possible to provide a computer system in which a computer can acquire fault information in response to interrupt to the OS even in the case of occurrence of a fault in the computer which fault might disable the OS from executing fault processing heretofore. Further, it is possible to provide a computer system in which a bus used by the computer to be managed can be initialized through the I/O bus.

BEST MODE FOR CARRYING OUT THE INVENTION

Embodiments of the present invention will be described below with reference to the drawings.

(1) First Embodiment

Figure 1:
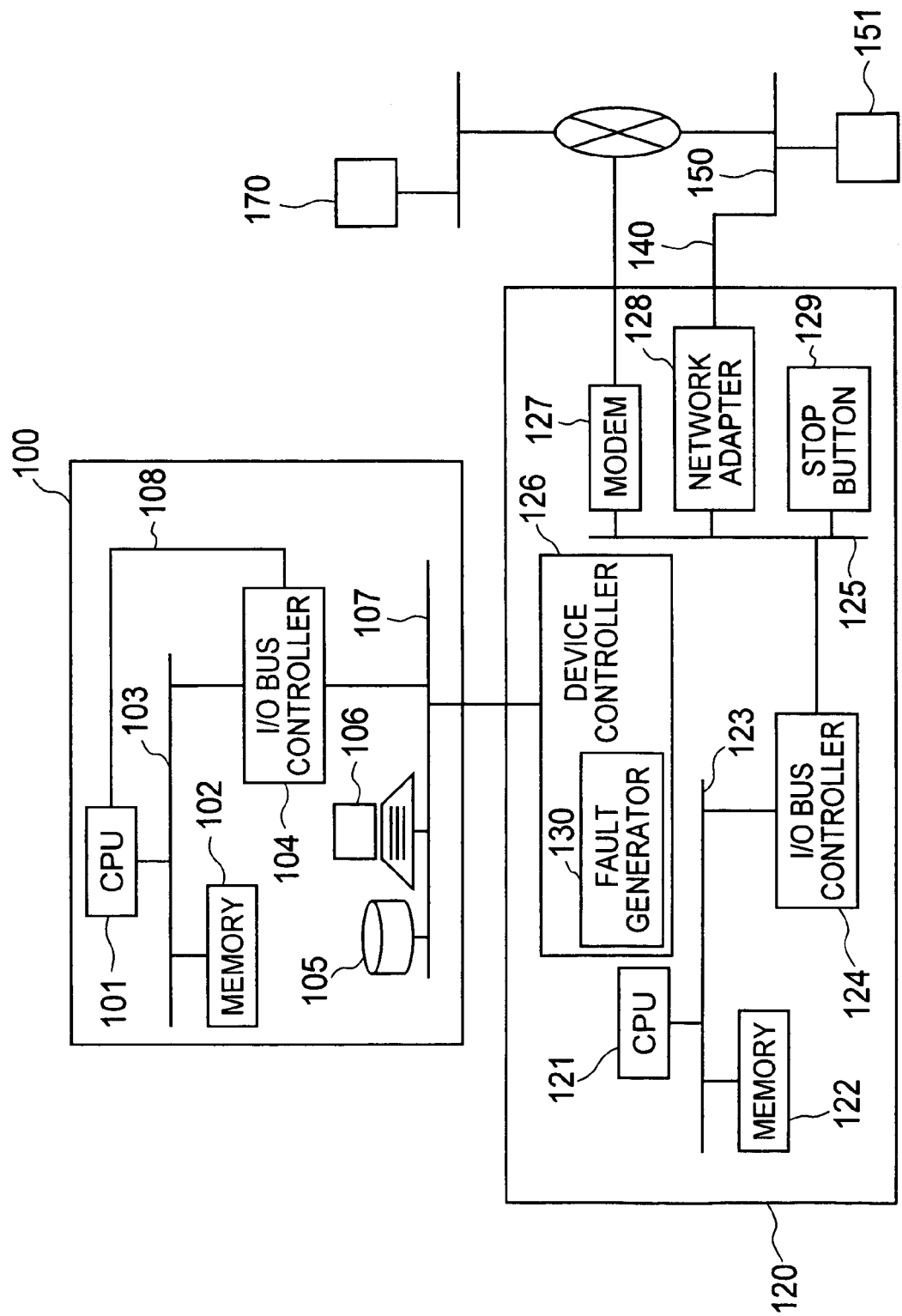
FIG. 1 is a system configuration view of an embodiment of the present invention.

FIG. 1 is a view showing the configuration of a system in an embodiment of the present invention. A computer 100 is a computer to be managed by a manager 120.

The configuration of the computer 100 will be described. A CPU 101 and a main memory 102 are connected to each other through a bus 103. An I/O bus controller 104 for controlling an I/O bus 107 is connected to the bus 103. The bus 103 contains a signal line which instructs the CPU 101 or the I/O bus controller 104 to reset the internal state concerning the bus 103. The I/O bus 107 extends from the I/O bus controller 104. A manager 120, an external storage device 105, a console 106 constituted by an interactive device such as a keyboard, a display, etc., and so on, are connected to the I/O bus 107.

The I/O bus controller 104 performs transfer of an input-output operation executed by the CPU 101 to the I/O bus 107, transfer of data from an input-output device connected to the I/O bus 107 to the main memory 102 or a register in the CPU 101, transfer of an interrupt to the CPU 101, and so on.

The I/O bus controller 104 and the CPU 101 are connected to each other through a bus error intercept line 108. The bus error intercept line 108 is a bus signal line through which the I/O bus controller 104 informs the CPU 101 of a bus error when the I/O bus controller 104 detects an error on the I/O bus 107.

The manager 120 will be described below. The manager 120 is a kind of external input-output device connected to the I/O bus 107 of the computer 100. The manager 120 remotely achieves supervision of the state of execution of the computer 100 and operation management such as starting, stopping, etc. The manager 120 constitutes a computer by itself. A program to be executed by the manager 120 can be executed independently even in the case where the OS of the computer 100 is halted. The program executed by the manager 120 controls a modem 127 and a network adapter 128 so that the manager 120 is linked with remote computers such as computers 151 and 170 to thereby achieve operation management for the computer 100 from the remote computer side.

A CPU 121 and a main memory 122 on the manager 120 are connected to each other through a bus 123. An I/O bus controller 124 is connected to the bus 123. An I/O bus 125 extends from the I/O bus controller 124. The modem 127 and the network adapter 128 are installed on the I/O bus 125 so as to make communication with the remote computers.

The manager 120 is connected to the I/O bus 107 of the computer 100 through a device controller 126. The device controller 126 receives an input-output operating request given from the CPU 101 to the manager 120 and performs control in accordance with the request. For example, the device controller 126 performs an operation of changing the contents of the main memory 122, an operation of transmitting an interrupt to the CPU 121, or the like.

The device controller 126 is configured to look like an input-output device also from the CPU 121 side. The device controller 126 performs an operation of writing out data onto the I/O bus 107, or the like, in response to an input-output operation executed by the CPU 121.

The device controller 126 includes a fault generator 130. The fault generator 130 is a device for transmitting an incorrect signal to the I/O bus 107 in response of an instruction from the CPU 121. When the I/O bus controller 104 in the computer 100 detects the incorrect signal on the I/O bus 107, the I/O bus controller 104 informs the CPU 101 of the fault through the bus error intercept line 108.

Figure 2:
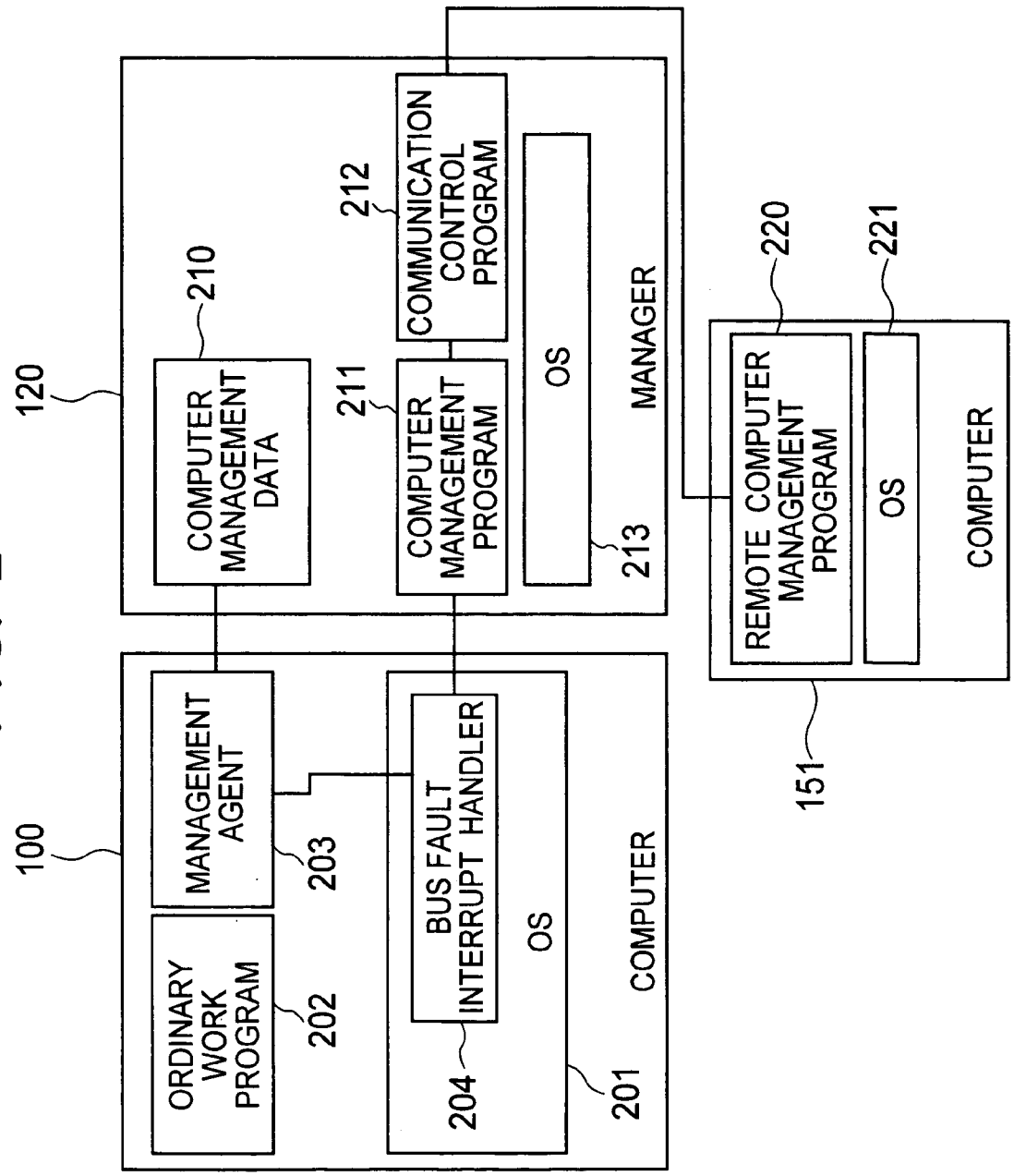
FIG. 2 is a configuration view of a program in the embodiment of the present invention.

FIG. 2 is a software configuration view of this embodiment of the present invention. In FIG. 2, the manager 120 is connected to the I/O bus 107 of the computer 100 and the network adapter 128 of the manager 120 is connected to a management computer 151 through a network.

The computers 100 and 151 and the manager 120 are loaded with OS's 201, 221 and 213 respectively. The OS's 201, 221 and 213 are under operation. In the computer 100, a group of general application programs 202 are under execution. In the computer 100, a management agent program 203 that cooperates with the manager 120 is further under operation. The management agent 203 collects the execution states of the programs 202 and OS 201 executed in the computer 100, transmits the execution states to the manager 120, instructs the manager 120 to operate, acquires the information of the execution states of the computer 100 collected by the manager 120 and performs operation management process. The operation management process includes setting the automatic start/stop time of the computer 100, shutdown, reboot, turning off the power source of the computer 100, displaying management information, transmitting the management information to the network, and so on.

In the manager 120, a communication control program 212 for performing communication with the remote computer 151 and a management program 211 for performing operation management of the computer 100 are under execution. The management program 211 executes acquisition of the operating state of the computer 100, power supply control of the computer 100 on the basis of designation of time, automatic booting/shutdown of the OS 201, transfer of information collected by the management agent 203 to the remote management computer 151, processing of a working operation request from the remote computer 151, and so on.

The programs 211 to 213 on the manager 120 can be executed even in the case where the OS 201 of the computer 100 is halted. When the computer 100 is stopping due to a fault on the OS 201, the management program 211 carries out fault processing such as acquirement of the contents of the main memory 102 via the I/O bus 107, transmission of fault information to the remote computer 151, and so on. In addition, in this embodiment, the management program 211 carries out a process of driving the fault generator 130 to transmit a fault signal to the I/O bus 107 to thereby execute a process to start fault processing by the OS 201.

The remote computer 151 or 170 is connected to the manager 120 through a network 150 such as LAN or through a communication line 140 such as a telephone line. In the remote computer 151, a remote computer management program 220 is under execution. The program 220 exchanges management information with the management program 211 on the manager 120 by communication and executes an operation management process of the computer 100. For example, the program 220 executes the display of the operation management information of the computer 100, the shutdown/rebooting of the computer 100 remotely, the instruction to start the fault processing by the OS 201, and so on.

When a fault occurs in the bus 103 or in the I/O bus 107, the CPU 101 generates a bus error interruption and executes fault processing. The OS 201 contains an interrupt handler 204 for processing the bus error interruption. The interrupt handler 204 is registered in an interrupt vector of the CPU 101 so as to be executed when a bus error interruption is generated.

Figure 3:
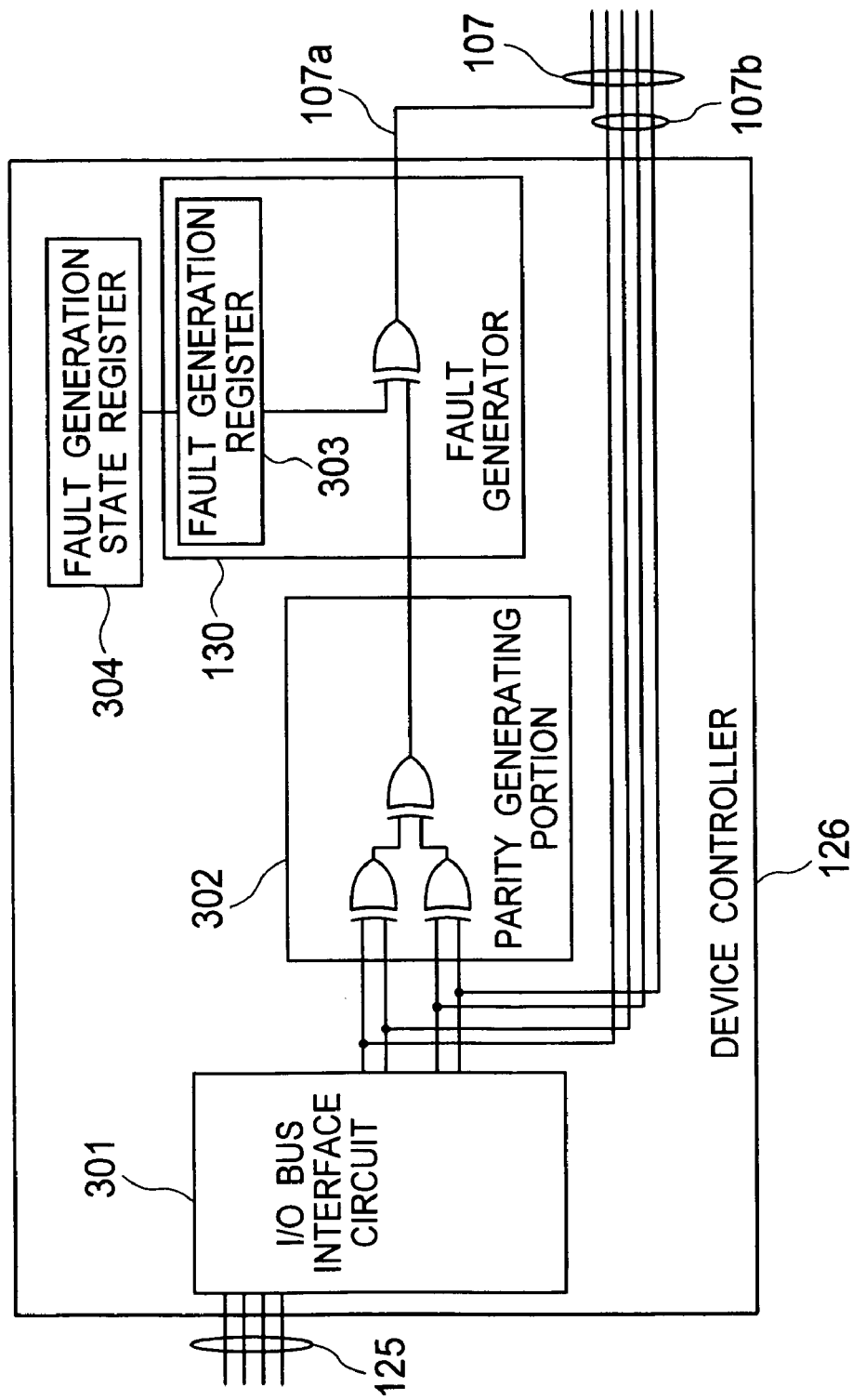
FIG. 3 is a configuration view of a device controller.

FIG. 3 is a view showing the configuration of the device controller 126 in this embodiment. The device controller 126 is connected to the I/O bus 125 of the manager 120 and the I/O bus 107 of the computer 100 through an I/O bus interface circuit 301. The circuit 301 is a circuit for taking out data from each I/O bus to the device controller 126 or transmitting data from the CPU to the I/O bus 107. The circuit 301 drives other circuits in the device controller 126 in accordance with the contents of the data obtained from the I/O bus 107.

The controller 126 includes a parity generating circuit 302 for the I/O bus 107, and a fault generator 130. In this embodiment, the parity generating circuit 302 generates a parity signal 107a by a combination of exclusive OR circuits, the parity signal 107a concerning an address signal 107b transmitted to the I/O bus 107. In an ordinary execution mode, the parity signal generated by the parity generating circuit 302 is directly sent out to the I/O bus 107.

The fault generator 130 generates a signal defined as a fault in the I/O bus 107 by inverting the parity signal generated by the parity generating circuit 302. The generation of the fault signal is controlled by a fault generation register 303. In an ordinary operation mode, the register 303 is set to "0". When the register 303 is set to "1", the fault generator 130 sends out a signal for making a fault to the I/O bus 107 by inverting the signal generated by the parity generating circuit 302.

The register 303 is configured so that it can be accessed by an input-output instruction from the CPU 121 of the manager 120. The management program 211 can force the OS 201 of the computer 100 to stop by setting the register 303 to "1" and executing an operation of making access to the I/O bus 107.

The fault generator 130 sets a fault generation state register 304 to "1" at a point of time when a fault signal is sent out as the parity signal 107a. Further, the fault generator 130 resets the register 303 to "0" so that the fault injection into the I/O bus 107 does not occur continuously.

Although this embodiment has shown the case where a fault is sent out to the I/O bus by changing the parity of the address signal to an incorrect value, the way of generating such an incorrect bus signal is not limited to the way mentioned above.

Figure 4:
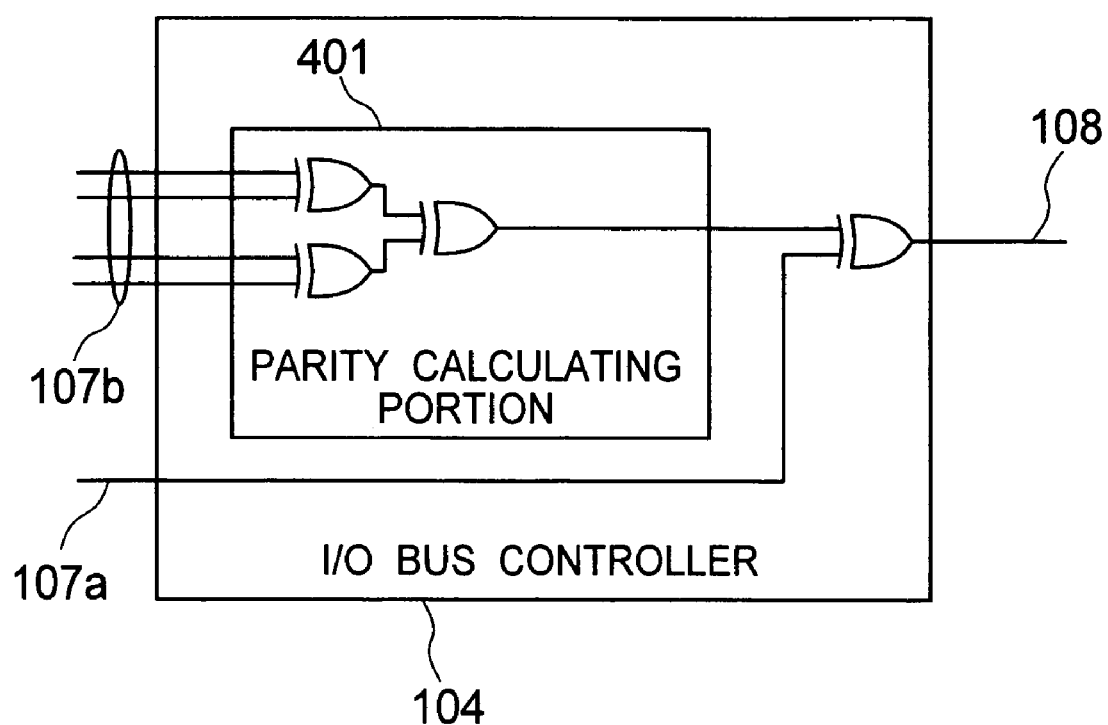
FIG. 4 is a configuration view of an I/O bus controller.

The I/O bus controller 104 will be described. FIG. 4 is a view showing a part of the configuration of the I/O bus controller 104 in this embodiment.

The I/O bus controller 104 performs data sending-out to the I/O bus 107 and data taking-in from the I/O bus 107. When data is taken-in, the parity signal 107a concerning the address signal 107b is referred to in order to check whether data on the I/O bus 107 are incorrect. A parity calculation circuit 401 in the I/O bus controller 104 calculates a parity value from the address signal 107b. This parity value is compared with that of the parity signal 107a on the I/O bus 107. When the two values are not the same, the CPU 101 is informed of a bus fault through the bus error intercept line 108.

When a signal for making a fault is issued from the fault generator 130 to the I/O bus 107, the CPU 101 is informed of the bus fault because the parity value becomes incorrect.

Figure 5:
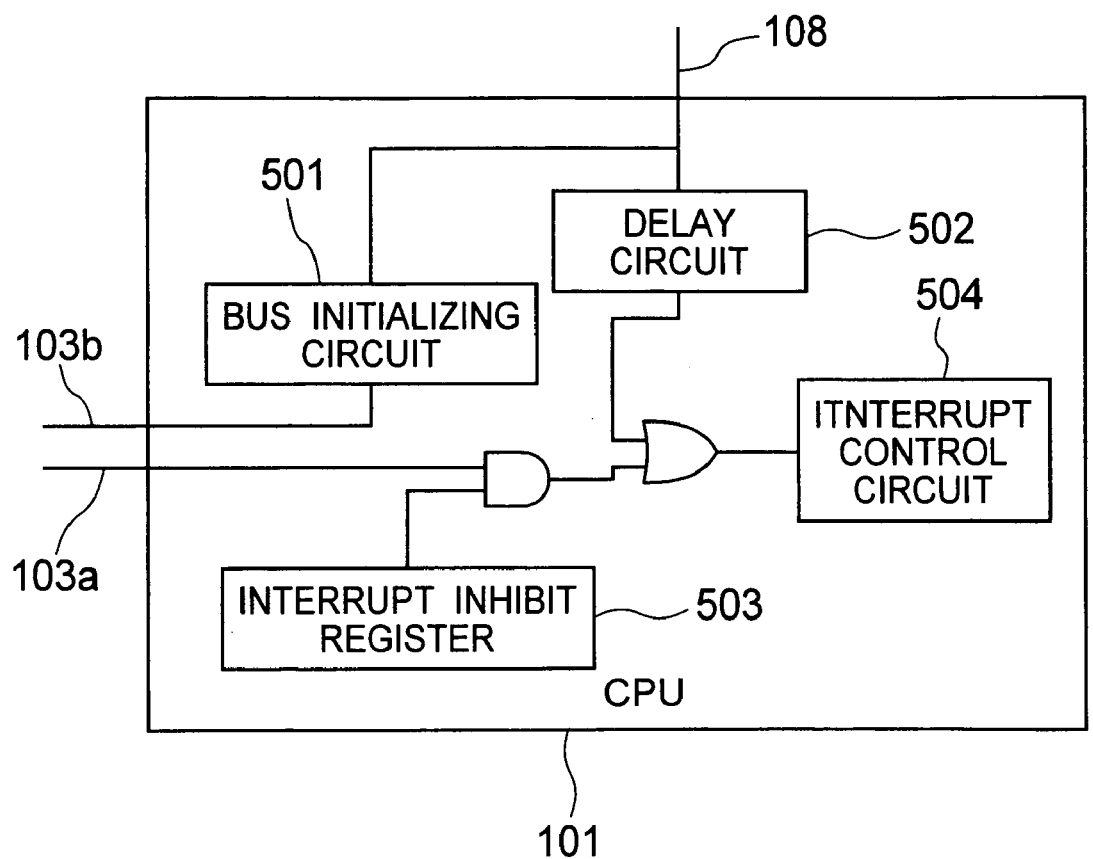
FIG. 5 is a configuration view of a fault processing portion in a CPU.

FIG. 5 shows a configuration concerning bus fault processing on the CPU 101 side. When informed of the bus fault through the bus error signal line 108, the CPU 101 drives a bus initializing circuit 501 to initialize the bus 103. The initialization of the bus 103 means not resetting of the CPU 101 but initializing the internal state of the CPU 101 concerning the bus. Because such bus initialization is also required of other devices connected to the bus 103, it instructs the other devices to do the bus initialization process by a bus initializing signal 103b.

Further, the CPU 101 causes a delay circuit 502 to delay the error intercept signal 108 so that the CPU 101 drives an interrupt control circuit 504 to internally generate a bus error interruption at a point of time when the initialization of the bus 103 is completed.

General external interruption is informed to the processor by an external interrupt signal 103a. The external interruption is masked in accordance with the value of an interrupt inhibit register 503. If interrupt due to bus error interception is configured to drive the interrupt control circuit 504 with bypassing mask control of the interrupt inhibit register 503, an interruption due to a bus fault can be generated even in the case where the CPU 101 is in an external interrupt-disabled state.

Figure 6:
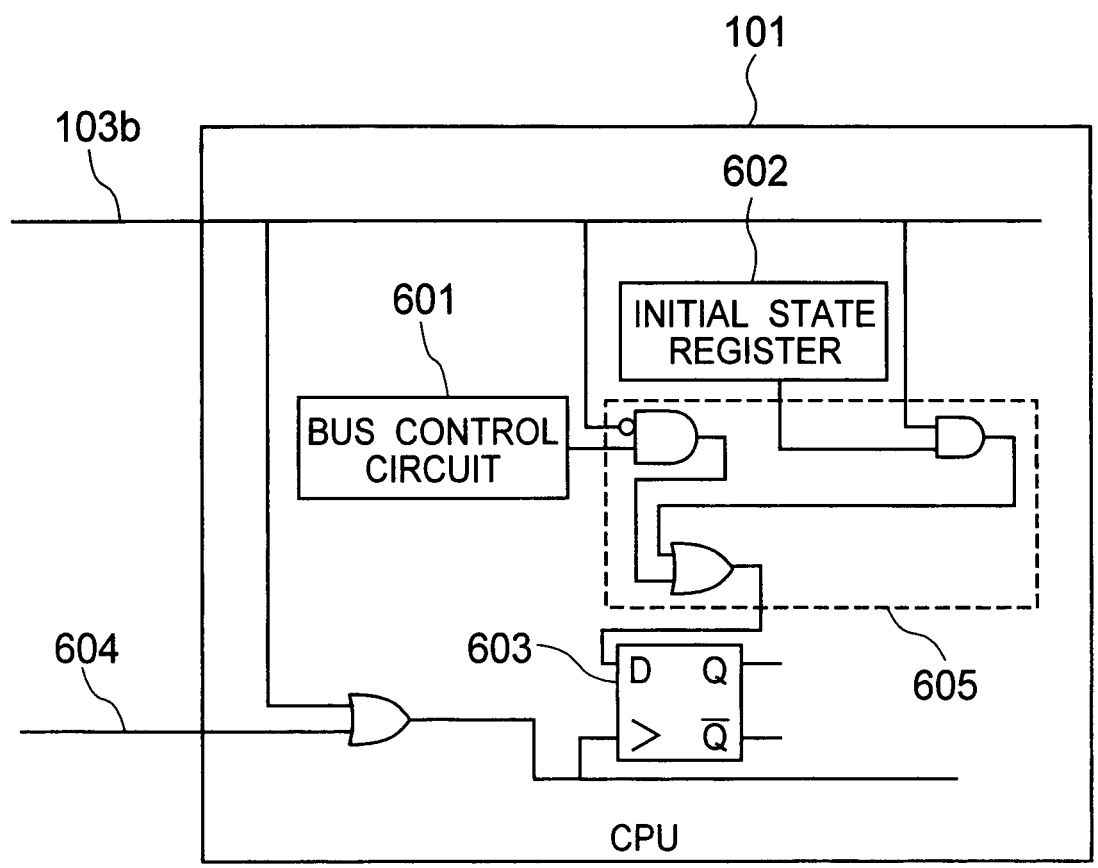
FIG. 6 is a configuration view of a bus initializing portion in the CPU.

The bus initialization of the CPU 101 will be described. FIG. 6 is a view showing an example of a configuration of the bus initializing circuit 501 of the CPU 101.

Circuits of the CPU 101 concerning buses are driven in synchronization with a clock signal 604.

The CPU 101 includes a circuit for controlling the bus 103. The circuit has a portion for holding a state concerning data which passed through the bus 103 in the past. In this example, it is assumed that a register 603 constituted by a flip-flop holds the bus state. The register 603 takes in the bus state in synchronization with the clock signal 604.

In an ordinary operation mode, the value of the register 603 is determined by a bus control circuit 601. A switching circuit 605 is configured so that the output value of the bus control circuit 601 reaches the register 603 when the bus initializing signal 103b is inactive, that is, zero.

The switching circuit 605 is configured so that the value set in an initial state register 602 reaches the register 603 when the bus initializing signal 103b is active. The value of the initial state register 602 is set in the CPU 101 in advance or set by initialization at the time of turning on the power supply to the computer 101. Hence, the CPU 101 can set the register 603 to an initial state in response to the bus initializing signal 103b.

Although this embodiment has shown the case where the CPU 101 sends out the bus initializing signal 103b to the bus 103, the present invention may be applied also to the case where each of devices connected to the bus 103 detects the bus error intercept signal 108 so that initialization is performed by the device.

According to the aforementioned hardware configuration, in this embodiment, the manager 120 connected to the I/O bus 107 of the computer 100 sends out a signal, which is defined as a fault in the I/O bus 107, to the I/O bus 107 at an optional point of time independent of the state of execution of the computer 100. It makes it possible to initialize the internal state which is held in each device connected to the bus 103 and which concerns the bus 103 and generate a bus error interrupt in the CPU 101.

Figure 7:
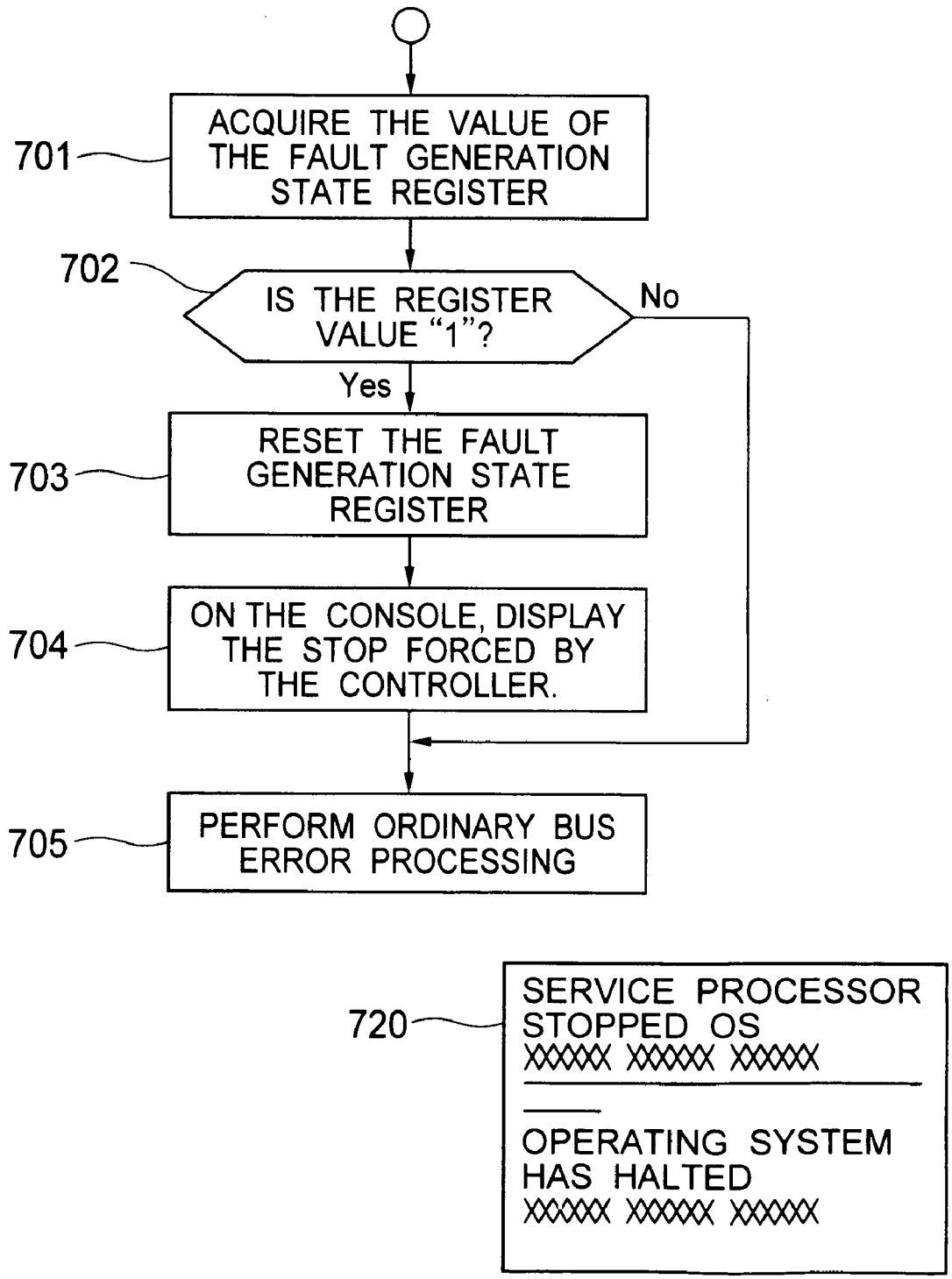
FIG. 7 is a flow chart of processing in a bus error interrupt handler of an OS.

Software processing in this embodiment will be described below. FIG. 7 is a flow chart showing processing performed by a bus error interrupt handler 204 in the OS 201 executed in the computer 100.

When the CPU 101 catches a bus error interruption, the CPU 101 passes the control to the interrupt handler 204 which starts from step 701. Such a bus error interruption may be generated intentionally by the manager 120 or not intentionally. The interrupt handler 204, first, acquires the value of the fault generation state register 304 in the manager 120 (step 701). The register 304 is configured so that the CPU 101 can make access to the register 304 via the I/O bus 107.

Then, the obtained value of the register 304 is checked (step 702). When the value of the register 304 is zero, that is, when the manager 120 does not send out the bus fault, an ordinary bus error process (step 705) is executed. For example, the bus error process includes displaying fault information on a console 106, dumping the main memory 102 onto an external storage device 105, restarting the computer 100, and so on.

When the register 304 is "1", that is, when the bus error is due to a fault injected by the manager 120 into the I/O bus 107, the fault state generating register is reset (step 703) and the fault information is displayed on the console 106 (step 704). The reference numeral 720 designates an example of console screen display.

Figure 8:
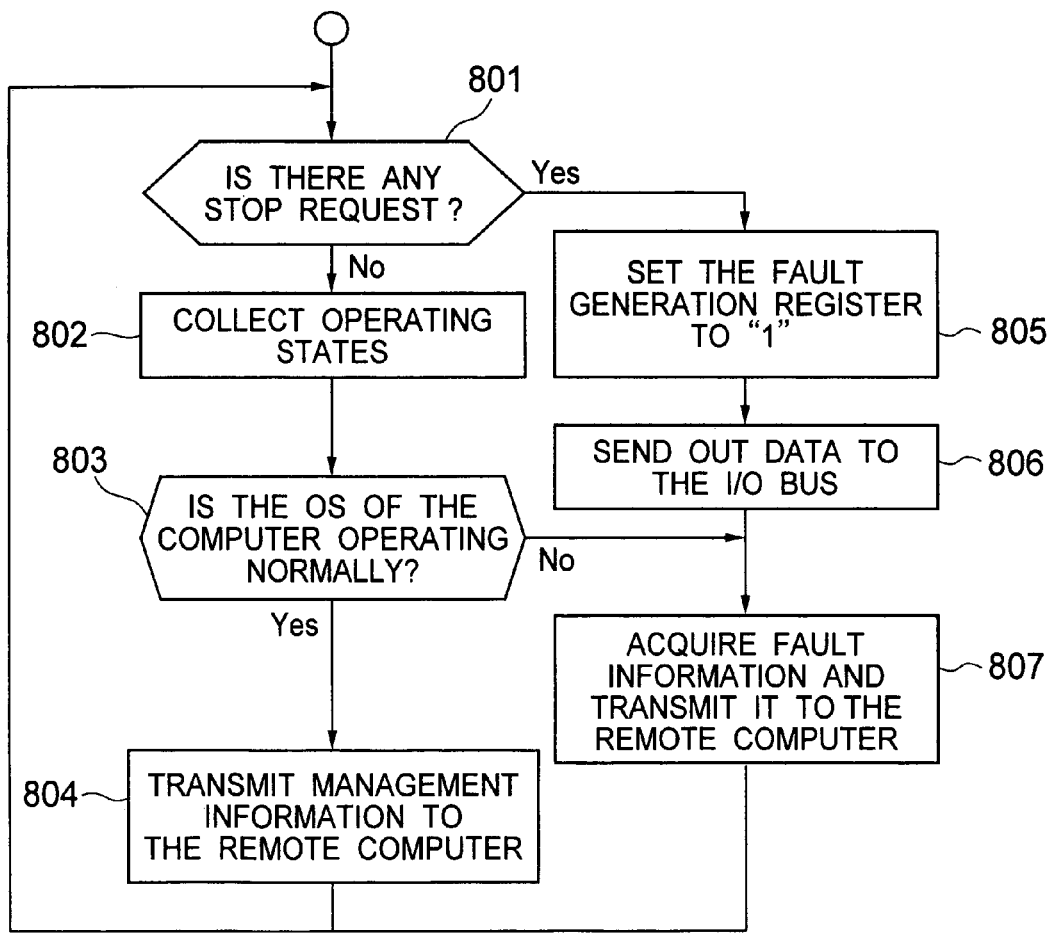
FIG. 8 is a flow chart of processing in a management program executed by a manager.

Processing performed by the management program 211 in the manager 120 will be described. FIG. 8 is a flow chart showing an example of processing performed by the management program 211.

First, in step 801, a judgement is made as to whether there is any shutdown request to the computer 100 or not. The shutdown request is sent from the remote computer 151 or 170 to the modem 127 or network adapter 128 via a communication line or it is generated by pushing-down of an emergency stop button 129, or the like.

When there is no stop request, operating states of the computer 100 are collected and stored in management data 210 (step 802). A judgment is made from the acquired data 210 as to whether the computer 100 operates normally or not (step 803). When the computer 100 operates normally, the operating states are transmitted to the remote computer (step 804). When the computer 100 is halting, the management program executes step 807 in which fault information is acquired and transmitted to the remote computer.

When there is any shutdown request, step 805 is executed. On this occasion, the fault generation register 303 is set to "1" and an instruction to make access to the I/O bus 107 is executed (step 806). Hence, a bus error interruption is generated in the CPU 101 so that control goes to the bus error interrupt handler 204.

Then, the management program executes step 807 in which fault information is transmitted to the remote computer.

According to the aforementioned hardware configuration and software procedure, the execution of the OS 201 in the computer 100 is forced shutdown by the manager 120 connected to the I/O bus 107. Hence, it is possible to execute the bus error interrupt handler 204 which is fault processing of the OS.

In this embodiment, the fault generator 130 in the manager 120 sends out a fault causing signal to the I/O bus 107 at an optional point of time regardless of the state of execution of the computer 100 to thereby achieve the forced shutdown of the OS 201 executed in the computer 100. In this embodiment, the computer 100 and the manager 120 are connected to each other through the I/O bus 107 alone. The limitation upon the computer 100 allowed to be connected to the manager 120 is relaxed compared with the background-art method in which a computer and a manager were connected to each other through a private signal line.

Moreover, the background-art manager made it difficult to analyze a cause of a fault because the restart of the computer was executed by resetting the CPU when the execution of the OS was halted due to the fault. On the contrary, in this embodiment, the I/O bus controller 104 informs the CPU 101 of bus error, so that the CPU 101 generates an interruption in response to the bus error and executes the interrupt handler 204. A fault process such as storing the contents of the main memory 102 in the external storage device 105, analyzing the cause of a fault, removing the cause of a fault, and so on, and a process for stopping the OS 201 can be executed by extension of the interrupt handler 204. Hence, it becomes easy to analyze and recover the fault after that.

Moreover, the CPU 101 generates an interruption after the CPU 101 and each of the devices connected to the bus 103 initialize their internal states concerning the I/O bus 103. Hence, the possibility that the interrupt handler 204 is executable becomes high.

Although this embodiment has shown the case where the contents of the main memory 102 are stored in the external storage device 105 by the bus error interrupt handler 204, the present invention may be applied also to the case where all or a part of the contents of the main memory 102 and fault analysis information given by the interrupt handler 204 are stored in the main memory 122 of the manager 120.

Although this embodiment has shown the case where the manager 120 sends out the fault signal to the I/O bus 107, the present invention may be applied also to the case where the fault signal generator 130 is incorporated in a device such as a network adapter or a modem so that a fault signal is sent out to the I/O bus 107 when a specific packet or data is received.

(2) Second Embodiment

A second embodiment of the present invention will be described below.

In the first embodiment, it is necessary that the manager 102 connected to the I/O bus 107 sends out a signal recognized as a fault to the I/O bus 107. Hence, the manager 120 must acquire the right to make access to the I/O bus 107. That is, the manager 120 must get the right to use the bus on the basis of arbitration of the bus 107.

In some case, however, the manager 120 cannot acquire the right to use the I/O bus 107. When the CPU 101 is to execute a certain continuous non-slit process for a device connected to the I/O bus 107, the CPU 101 gets the right to use the bus as the right to exclusively use the I/O bus 107. This is called "locking the bus". If the device cannot give an answer at this time by reason of breakdown of the target device, or the like, the right to use the bus 107 is not freed.

In such a case, in the first embodiment, the fault processing by the OS 201 in the computer 100 cannot be started by the manager 120 because the fault signal cannot be injected into the I/O bus 107.

In the second embodiment of the present invention, means and procedure for transmitting the fault signal after unlocking the bus will be described. In this embodiment, it is configured so that the manager 120 can check the lock state of the I/O bus 107. Moreover, the manager 120 sends out arbitrary data against an I/O bus request which is not terminated with the bus locked. As a result, the manager 120 deceives the request source as if the requested operation was terminated, and makes the request source unlock the bus.

Figure 9:
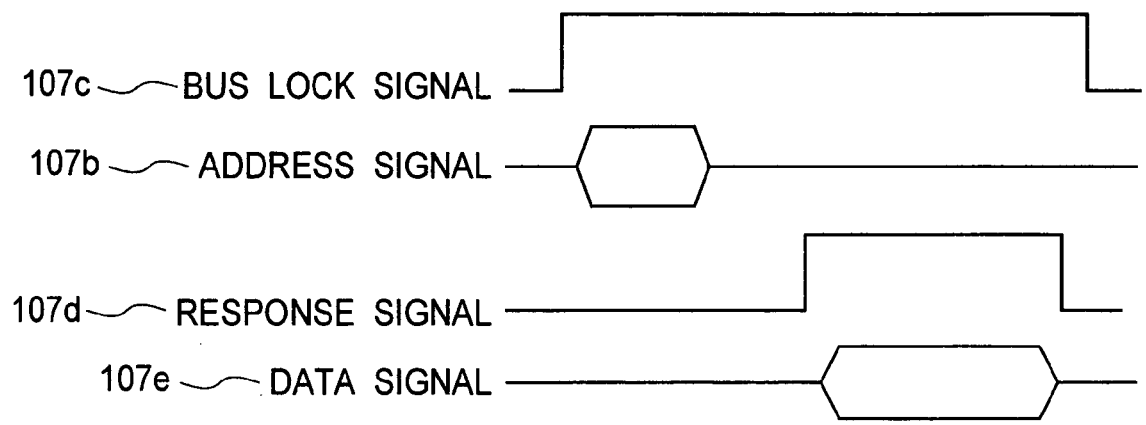
FIG. 9 is a view showing signal timing on an I/O bus.

A flow of data on the I/O bus will be described. FIG. 9 is a timing chart showing a flow of data on the I/O bus 107 in this embodiment.

FIG. 9 shows states of bus signals in the case where data transfer is made actually after arbitration of the right to make access to the I/O bus 107 is completed. A device to make access to the I/O bus 107 acquires the right to make access to the bus and then outputs an address signal 107b for designating the device as a target of access.

When this access is to be executed exclusively, an I/O bus lock signal 107c is made active simultaneously. Any other devices connected to the I/O bus 107 are configured so that they cannot issue the next request to the I/O bus 107 while the bus lock signal 107c is active. The request source device keeps the bus lock signal 107c active until it finishes the operation.

The device designated by the address signal 107b makes a response signal 107d active when the operation is completed. If there is any data on this occasion, the device outputs the data to a data signal line 107e.

The request source device detects that the response signal 107d becomes active. Hence, the request source device takes in the data from the data signal line 107e and makes the bus lock signal 107c inactive.

Figure 10:
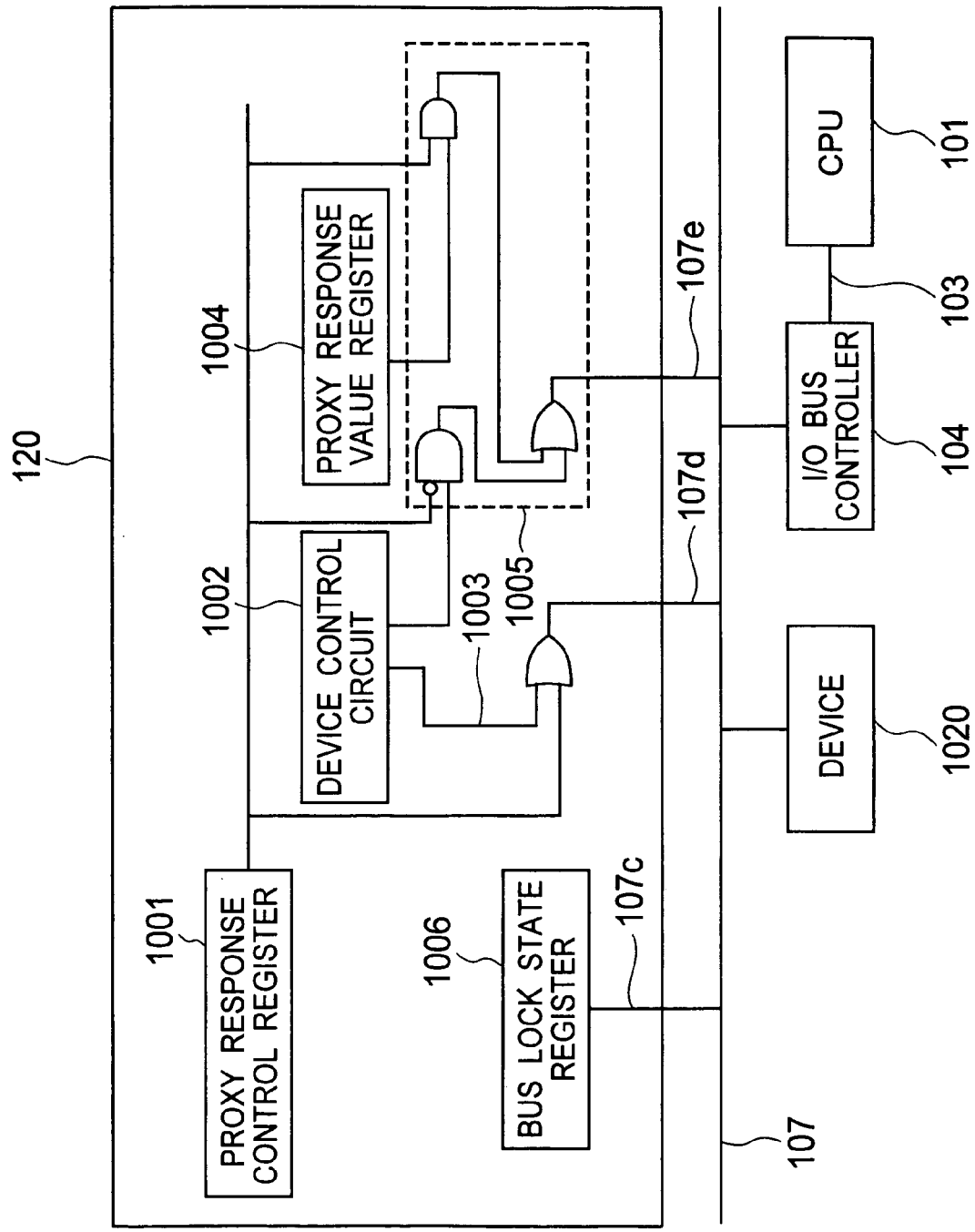
FIG. 10 is a configuration view of a bus unlocker in the manager in a second embodiment of the present invention.

FIG. 10 is a view showing the configuration of the controller 120 in the second embodiment. Description will be made on the assumption that the CPU 101 issues a non-split continuous I/O request to a device 1020 but the device 1020 cannot give an answer.

When the CPU 101 issues a non-split I/O request, the I/O bus controller 104 makes the bus lock signal 107c of the I/O bus 107 active.

The controller 120 has a bus lock state register 1006 provided for holding the bus lock signal 107c at each point of time. The bus lock state register 1006 is configured so as to be read by the CPU 201 on the manager 120. Hence, the management program 211 can find the value of the register.

The manager 120 is configured in a normal operation mode so that the manager 120 outputs the response signal 107d only when the controller 120 is designated by the address signal 107b on the I/O bus 107. In addition, the manager 120 has means for sending out the response signal 107d to the I/O bus 107 at any time on the basis of an instruction from the management program 211.

The response signal 107d is controlled by a proxy response control register 1001. When the proxy response control register 1001 is "0", a response signal 1003 output from a device control circuit 1002 is output as the response signal 107d on the I/O bus.

The I/O bus data signal 107e is also controlled by the proxy response control register 1001. The switching circuit 1005 outputs the output value of the device control circuit 1002 or the output value of a proxy response value register 1004 to the data signal 107e in accordance with the value of the register 1001.

That is, when the proxy response control register 1001 is set to "1", the response signal 107d becomes active and the value stored in the proxy response value register 1004 is sent out to the bus data signal 107e.

Figure 11:
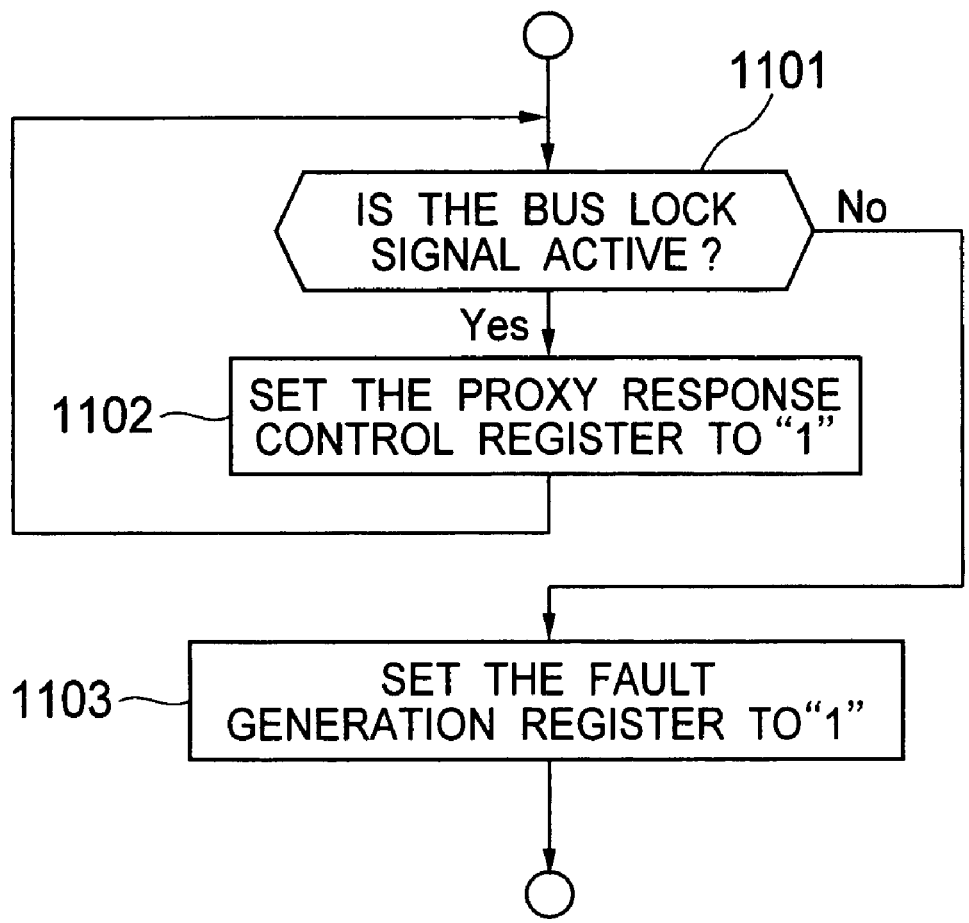
FIG. 11 is a flow chart of processing in a management program executed by the manager in the second embodiment of the present invention.

Processing in the control program 211 in this embodiment will be described below. FIG. 11 is a flow chart showing a process of the control program 211 for forcing the OS 201 to stop.

First, the control program 211 makes a judgment by referring to the bus lock state register 1006 as to whether the I/O bus 107 is locked or not (step 1101). When the I/O bus 107 is not locked, the control program goes to step 1103 in which the fault generation register 303 is set to "1" and a fault signal is injected into the I/O bus 107 by the same procedure as in the first embodiment.

When the I/O bus 107 is locked, the control program goes to step 1102. In the step 1102, the proxy response control register is set to "1". Hence, the management program 211 tries to unlock the I/O bus 107 and then the control program goes back to the step 1101 so that it checks the bus lock state again. If the bus is unlocked, the control program goes to step 1103 in which a fault signal is injected.

According to the aforementioned means and procedure, the manager 120 can inject the fault signal into the I/O bus 107 even in the case where the I/O bus 107 is locked by another device. Hence, the fault range allowing to forcedly stop the OS 201 from the manager 120 connected to the computer 100 by the I/O bus 107 alone is enlarged.

(3) Third Embodiment

A third embodiment of the present invention will be described below. In the second embodiment, the unlocking of the I/O bus 107 and the controlling of the fault injection into the I/O bus 107 are executed individually. In this embodiment, means for gathering these into one circuit in the controller 120 will be described.

Figure 12:
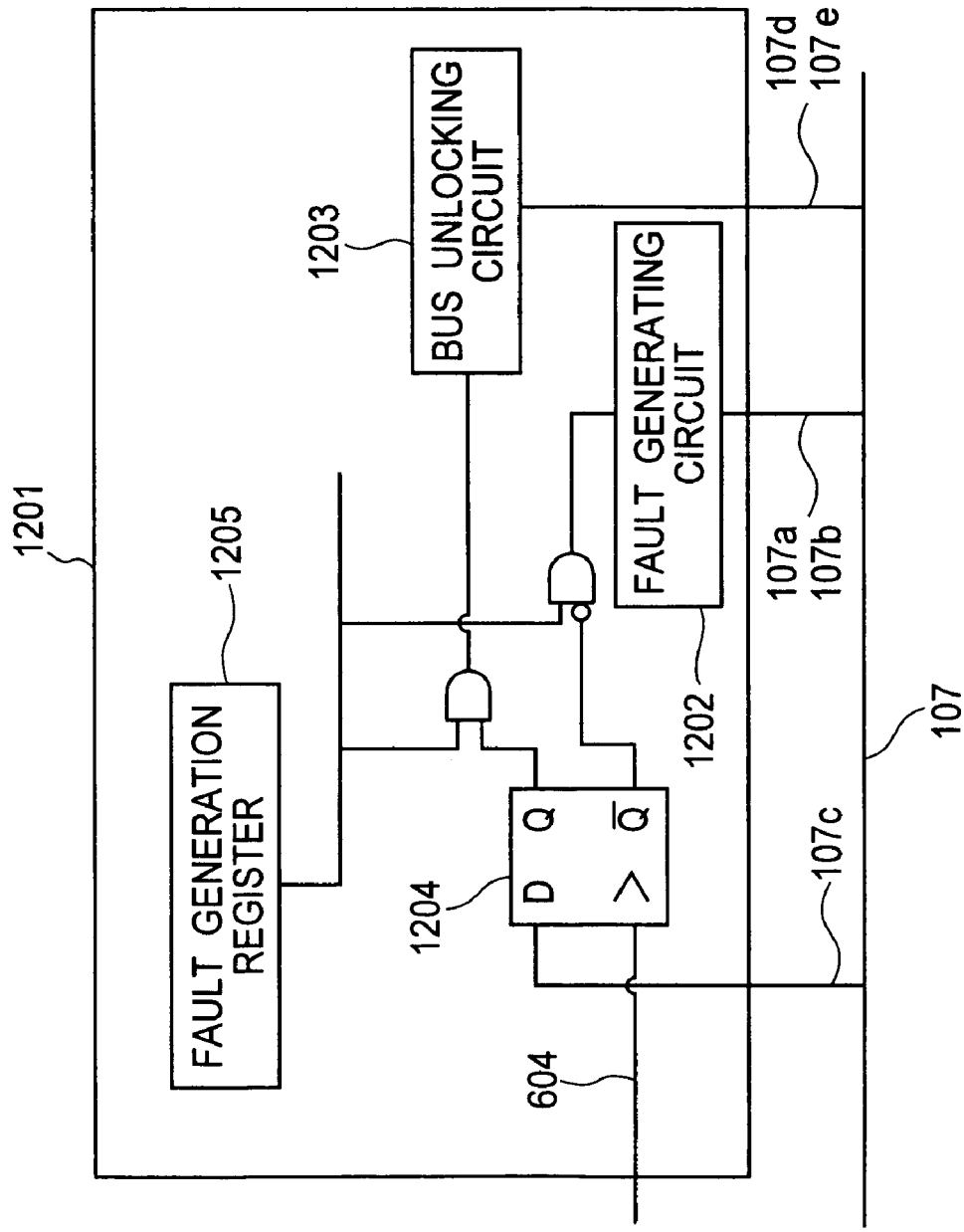
FIG. 12 is a configuration view of a fault generator in the manager in a third embodiment of the present invention.

FIG. 12 is a view showing the configuration of a fault generator 1201 in this embodiment. The fault generator 1201 includes a fault generating circuit 1202, and a bus unlocking circuit 1203. The fault generating circuit 1202 has the same configuration as that of the fault generator 130 in the first embodiment shown in FIG. 3. Also the bus unlocking circuit 1203 has the same configuration as that in the second embodiment shown in FIG. 10.

The fault generator 1201 fetches the bus lock signal 107c on the I/O bus 107 in synchronization with a clock 604 and stores the bus lock signal 107c in a bus lock state register 1204.

The fault generator 1201 carries out controlling the injection of the fault signal on the basis of a fault generation register 1205. When the fault generation register 1205 is "0", the fault generating circuit 1202 and the bus unlocking circuit 1203 are inoperative. When the execution of the OS 201 is to be stopped, the control program 211 sets the fault generation register 1205 to "1".

If the bus lock signal 107c is inactive when the fault generation register 1205 is set to "1", the fault generating circuit 1203 operates. The circuit 1203 sends out a fault causing signal to the I/O bus 107.

If the bus lock signal 107c is active when the register 1205 is set to "1", a bus unlocking circuit 1204 operates. The circuit 1204 sends out the bus response signal 107d and the bus data signal 107e to the I/O bus 107 to try to unlock the bus.

When the bus is unlocked, that is, when the bus lock signal 107c becomes inactive, the fault generating circuit 1203 operates to send out the fault signal to the I/O bus 107.

According to this embodiment, the execution of the computer 100 can be stopped relatively securely compared with the case where software monitors the lock signal and injects the fault signal as in the second embodiment. Moreover, the software control portion in the second embodiment can be omitted.

In the second and third embodiments, the manager 120 unlocked the bus by sending out a pseudo-response signal to the I/O bus 107. In some I/O bus 107, a response destination must be designated for response in accordance with the configuration of the I/O bus 107. In this case, the manager 120 may preferably record identifiers on the bus of devices sending out bus transactions requiring the locked bus.

(4) Fourth Embodiment

A fourth embodiment of the present invention will be described below. Although the aforementioned embodiments have been described upon a method for stopping the execution of the computer 100 by connection via the I/O bus 107 alone, the manager 120 may be provided with a background-art private signal line additionally. When, for example, the execution of the computer 100 is to be stopped, the means according to the present invention first tries to stop the OS 201. If the OS 201 cannot be stopped by the means according to the present invention, the computer 100 is reset by the background-art means. The configuration of the computer 100 and the manager 120 to achieve this purpose will be described.

Figure 13:
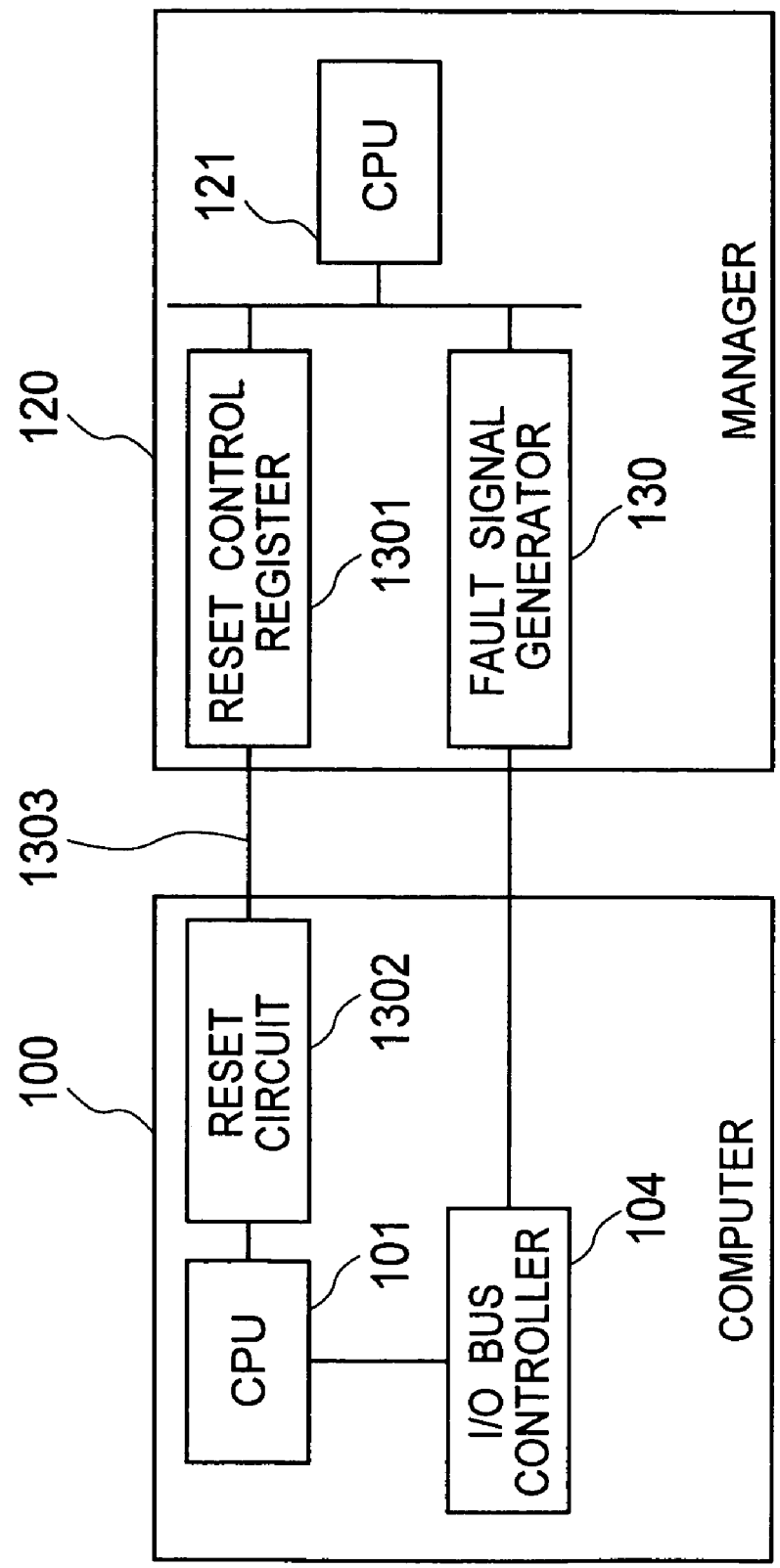
FIG. 13 is a configuration view of a computer and a manager in a fourth embodiment of the present invention.

FIG. 13 is a view showing the configuration of the computer 100 and the manager 120 in the fourth embodiment. The computer 100 has a reset circuit 1302 for resetting the CPU 101. The reset circuit 1302 is connected to the manager 120 by a reset control line 1303. When the reset control line 1303 becomes active, the reset circuit 1302 operates to reset the CPU 101. As a result, the computer is reset as a whole.

The manager 120 has a reset control register 1301. The reset control register 1301 is configured so as to be set from the CPU 121. It is configured so that the reset control line becomes active when the reset control register 1301 is set to "1".

Figure 14:
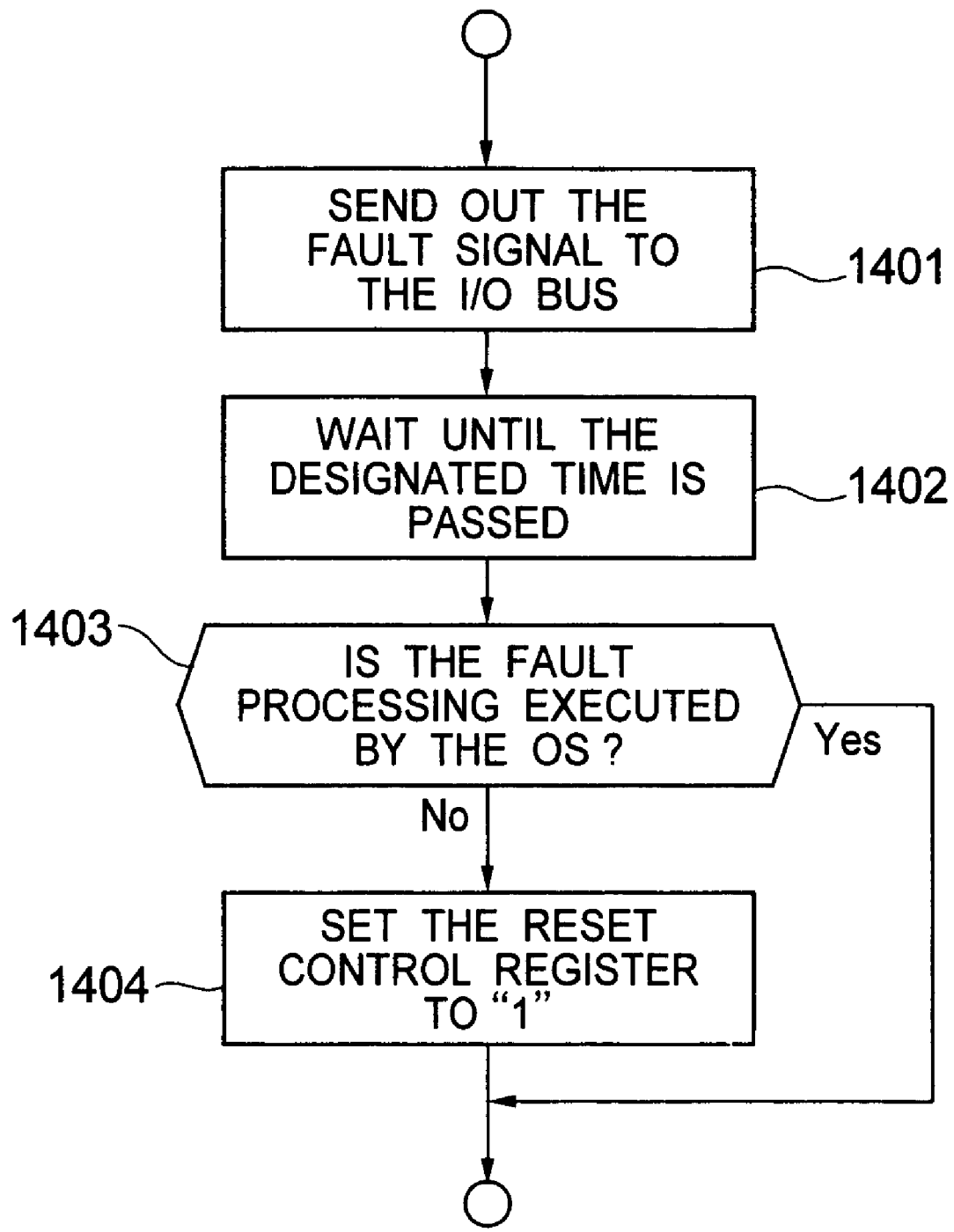
FIG. 14 is a flow chart of a computer shutdown process executed by the manager in the fourth embodiment of the present invention.

A flow of the process of the management program 211 for stopping the computer 100 will be described below. FIG. 14 shows a flow chart thereof. First, the fault generator 130 is driven to send out the fault signal to the I/O bus 107 (step 1401). After waiting for a predetermined time (step 1402), a judgment is made as to whether the fault processing is already executed by the OS 201 or not (step 1403). If the fault processing is not executed, the reset control register 1302 is set to "1" to thereby reset the computer 100 in step 1404.

(5) Fifth Embodiment

Although the aforementioned embodiments have shown the case where the remote computer or a person operating the remote computer gives an opportunity of sending out a fault to the I/O bus 107, the present invention may be applied also to the case where the manager 120 or the management program 211 determines whether fault sending-out is to be executed or not. In a fifth embodiment of the present invention, a method for executing fault sending-out by cooperation with the management program 211 and the management agent program 203 will be described. The manager 120 has an agent starting register for indicating the execution of the management agent 203. The agent starting register is configured so that both the CPU 101 of the computer 100 and the CPU 201 of the manager 120 can make access to the agent starting register (not shown).

The management agent 203 is executed at regular time intervals so that the agent starting register is set with every execution (not shown in flow chart). On the manager 120 side, a judgement is made by referring to the agent starting register as to whether the computer 100 operates normally or not.

Figure 15:
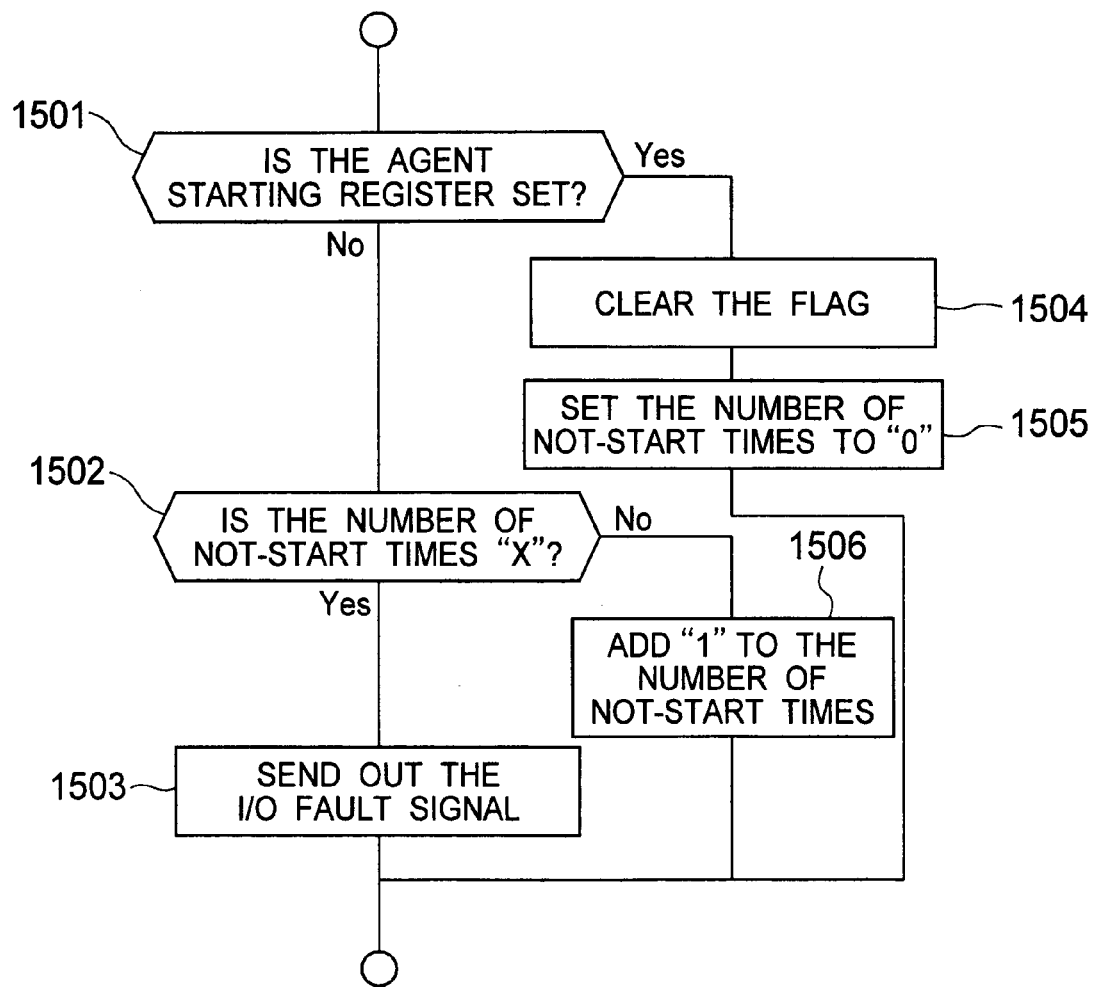
FIG. 15 is a flow chart of a computer shutdown process executed by the manager in a fifth embodiment of the present invention.

FIG. 15 is a flow chart showing a process of the management program 211 executed in the manager 120. The process shown in FIG. 15 is configured so as to be executed at regular time intervals.

The management program 211 holds a variable (the number of not-start times) for recording the number of times by which the agent starting register is not set when the register is checked.

The process of the management program 211 will be described. First, the agent starting register of the manager 120 is checked (step 1501). When the register is set, the register is cleared (step 1504) and the number of not-start times is set to "0" (step 1505). Then, the process is finished.

When the register is not set, the number of not-start times is checked (step 1502). When the number of not-start times is a predetermined positive integer X, the fault signal is sent out to the I/O bus 107 (step 1503). When the number of not-start times is not X, "1" is added to the number of not-start times (step 1506). Then, the process is finished.

In the aforementioned manner, the management program 211 can send out a fault to the I/O bus 107 spontaneously by checking the state of execution of the computer 100. When the fault is sent out, a message for indicating the forced stop of the computer 100 may be transmitted to the remote computer 151 or 170.

Although the fifth embodiment has shown the case where fault sending-out to the I/O bus 107 is executed by software, the present invention may be applied also to the case where a watchdog timer is provided in the manager 120 so that the fault generator 130 is driven when the watchdog timer has been not reset for a predetermined time.

In this case, the management agent 203 is executed at regular time intervals so that it resets the watchdog timer every execution. There is no special process required on the management program 211 side.

Further, the management program 120 may check the state of execution of the OS 201 by referring to the contents of the main memory 102 in the computer 100 so that it sends out the fault signal to the I/O bus 107 correspondingly.

INDUSTRIAL APPLICABILITY

As described above, a method and system for processing a fault in a computer according to the present invention is adapted for construction of a computer system in which a manager sends out a fault generating signal to a computer to be managed via an I/O bus whereas the computer to be managed initializes the bus and generates an interruption in response to the reception of the signal.

What is claimed is:

1. A fault processing method in a computer system having a computer and a manager connected to each other through an I/O bus, comprising the steps of:
    generating an I/O bus signal which makes the I/O bus fail; and
    transmitting said I/O bus signal from said manager to the I/O bus at a predetermined point of time to generate an I/O bus fault to thereby make an I/O bus manager in said computer initialize said I/O bus, and then informing a CPU in said computer of said I/O bus fault as an interrupt to be processed by an OS operated by said CPU;
    wherein said predetermined point of time is a point of time when a fault occurs in said computer.

2. A fault processing method in a computer system according to claim 1, wherein said OS carries out fault processing in response to said interrupt.

3. A fault processing method in a computer system having a computer and a manager connected to each other through an I/O bus, comprising the steps of:
    generating an I/O bus signal which makes the I/O bus fail; and
    transmitting said I/O bus signal from said manager to the I/O bus at a predetermined point of time to generate an I/O bus fault to thereby make an I/O bus manager in said computer initialize said I/O bus, and then informing a CPU in said computer of said I/O bus fault as an interrupt to be processed by an OS operated by said CPU;
    wherein said predetermined point of time is a point of time when an incorrect data is transmitted from said computer to said manager.

4. A fault processing method in a computer system having a computer and a manager connected to each other through an I/O bus, comprising the steps of:
    generating an I/O bus signal which makes the I/O bus fail; and
    transmitting said I/O bus signal from said manager to the I/O bus at a predetermined point of time to generate an I/O bus fault to thereby make an I/O bus manager in said computer initialize said I/O bus, and then informing a CPU in said computer of said I/O bus fault as an interrupt to be processed by an OS operated by said CPU;
    wherein said predetermined point of time is a point of time when said computer does not update contents of a predetermined storage device within a predetermined time.

5. A computer system, comprising a computer which includes a CPU, an I/O bus, and an I/O bus manager; and a manager which connected to said computer via said I/O bus,
    wherein said manager generates an I/O bus signal which makes the I/O bus fail and transmits said I/O bus signal to said I/O bus at a predetermined point of time to generate an I/O bus fault,
    wherein said I/O bus manager initializes said I/O bus in response to occurrence of said I/O bus fault, and then informs said CPU of said I/O bus fault as an interrupt to be processed by an OS operated by said CPU; and
    wherein said predetermined point of time is a point of time when a fault occurs in said computer.

6. A computer system according to claim 5, wherein said OS carries out fault processing in response to said interrupt.

7. A computer system, comprising a computer which includes a CPU, an I/O bus, and an I/O bus manager; and a manager which connected to said computer via said I/O bus,
    wherein said manager generates an I/O bus signal which makes the I/O bus fail and transmits said I/O bus signal to said I/O bus at a predetermined point of time to generate an I/O bus fault,
    wherein said I/O bus manager initializes said I/O bus in response to occurrence of said I/O bus fault, and then informs said CPU of said I/O bus fault as an interrupt to be processed by an OS operated by said CPU; and
    wherein said predetermined point of time is a point of time when an incorrect data is transmitted from said computer to said manager.

8. A computer system, comprising a computer which includes a CPU, an I/O bus, and an I/O bus manager; and a manager which connected to said computer via said I/O bus,
    wherein said manager generates an I/O bus signal which makes the I/O bus fail and transmits said I/O bus signal to said I/O bus at a predetermined point of time to generate an I/O bus fault,
    wherein said I/O bus manager initializes said I/O bus in response to occurrence of said I/O bus fault, and then informs said CPU of said I/O bus fault as an interrupt to be processed by an OS operated by said CPU; and
    wherein said predetermined point of time is a point of time when said computer does not update contents of a predetermined storage device within a predetermined time.

9. A computer system, comprising:
    a computer; and
    a management computer;
    wherein said computer comprises a CPU, an I/O bus, and an I/O bus manager;
    wherein said computer and said management computer are connected to each other by said I/O bus;

wherein said management computer is adapted to generate a signal which makes said I/O bus fail and to output said signal to said I/O bus;

wherein said I/O bus manager is adapted to detect an I/O bus fault which is caused by said signal, initialize said I/O bus, and inform said CPU of said I/O bus fault as an interrupt to be processed by an OS executed by said CPU;

wherein said management computer has an interface which is connected to an external device via a network, and wherein said management computer outputs said I/O signal when said management computer receives an instruction from said external device via said interface; and wherein said management computer unlocks said I/O bus before outputting said I/O signal if said I/O bus is locked.

\* \* \* \* \*